(12) United States Patent
Basil et al.

(10) Patent No.: US 7,308,575 B2
(45) Date of Patent: Dec. 11, 2007

(54) DATA SCRAMBLING SYSTEM FOR A SHARED TRANSMISSION MEDIA

(75) Inventors: Robert P. Basil, Lawrenceville, GA (US); John B. Terry, deceased, late of Cumming, GA (US); by Dorothy Terry, legal representative, Cumming, GA (US); Gordon Thomas Mitchell, Lawrenceville, GA (US); Bradley Richard Ree, Snellville, GA (US)

(73) Assignee: Arris Group, Inc., Suwanee, GA (US)

( * ) Notice: Subject to any disclaimer, the term of this patent is extended or adjusted under 35 U.S.C. 154(b) by 1087 days.

(21) Appl. No.: 10/010,894

(22) Filed: Nov. 8, 2001

(65) Prior Publication Data

US 2002/0138850 A1 Sep. 26, 2002

Related U.S. Application Data

(63) Continuation-in-part of application No. 09/818,378, filed on Mar. 27, 2001, now abandoned.

(60) Provisional application No. 60/246,684, filed on Nov. 8, 2000, provisional application No. 60/193,855, filed on Mar. 30, 2000.

(51) Int. Cl.
*H04L 9/00* (2006.01)
*H04K 1/00* (2006.01)

(52) U.S. Cl. .................. 713/168; 713/171; 380/44; 380/210; 380/262; 380/273

(58) Field of Classification Search .................. None
See application file for complete search history.

(56) References Cited

U.S. PATENT DOCUMENTS

| | | | |
|---|---|---|---|
| 5,375,169 A | 12/1994 | Seheidt et al. | |
| 5,432,850 A * | 7/1995 | Rothenberg | 713/162 |
| 5,734,720 A * | 3/1998 | Salganicoff | 380/211 |
| 5,784,597 A * | 7/1998 | Chiu et al. | 713/401 |
| 5,787,483 A * | 7/1998 | Jam et al. | 711/158 |
| 5,805,705 A * | 9/1998 | Gray et al. | 713/160 |
| 5,825,890 A | 10/1998 | Elgamel et al. | |
| 6,028,933 A * | 2/2000 | Heer et al. | 713/169 |
| 6,061,440 A | 5/2000 | Delaney et al. | |
| 6,169,802 B1 * | 1/2001 | Lerner et al. | 380/44 |

(Continued)

FOREIGN PATENT DOCUMENTS

EP 0765061 A2 3/1997

(Continued)

OTHER PUBLICATIONS

Schneier, B. *Applied Cryptography Passage*, Applied Cryptography, Protocols, Algorithms, and Source Code in C, John Wiley & Sons, pp. 372-375; 419-420 (New York 1996).

*Primary Examiner*—Ayaz Sheikh
*Assistant Examiner*—Trang Doan

(57) ABSTRACT

Methods of providing added security for communications between a server and a particular client modem on a shared communication media. The methods provide for passing communications containing scrambled keys to be used to form scrambling seeds for scrambling subsequent messages. In a preferred embodiment, both the server and the client modem generate and pass keys to be used for the communications between the server and that client modem to achieve a dynamic dual key scrambling system.

18 Claims, 5 Drawing Sheets

| STEP | Sequence | Direction | Pass scramble seed: | Scramble both the message and the passed key with: | Un-scramble with: | Receive scramble key: |
|---|---|---|---|---|---|---|
| 400 | Server learns the MAC ID of client modem | | | | | |
| 410 | Send by server | downstream | nothing | Seeds based on MAC ID of client modem | | |
| 414 | Receive by client | | | | seeds based on own MAC ID | client receives no key |
| 420 | Send by client | upstream | upstream CRC code | Seeds based on MAC ID of client modem | | |
| 424 | Receive by server | | | | with seeds based on client modem MAC ID (the MAC ID of the client is known since by implication in a polling based system). | upstream CRC code |
| 430 | Send by server | downstream | random number | First by MAC ID based seed then with Seed based on the upstream CRC code | | |
| 434 | Receive by client | | | | First by seed based on the last upstream CRC code then by seed based on MAC ID | random number |
| 440 | Send by client | upstream | new upstream CRC code | First by seed based on the random number then by seed based on last upstream CRC code | | |
| 444 | Receive by server | | | | first by seed based on the last upstream CRC code then by seed based on the random number | new upstream CRC code |
| 450 | Send by server | downstream | new random number | first by seed based on the last random number then by seed based on the new CRC code | | |
| 454 | Receive by client | | | | first by seed based on the last upstream CRC code then by seed based on the last random number | new random number |
| 460 | Repeat steps 440 through 454 until new power up or lack of response causes restart with MAC ID | | | | | |

U.S. PATENT DOCUMENTS

| | | |
|---|---|---|
| 6,223,287 B1 | 4/2001 | Douglas et al. |
| 6,259,789 B1 * | 7/2001 | Paone ......................... 380/28 |
| 6,424,717 B1 * | 7/2002 | Pinder et al. ............... 380/239 |
| 6,637,032 B1 * | 10/2003 | Feinleib ...................... 725/110 |
| 6,782,475 B1 * | 8/2004 | Sumner ...................... 713/163 |

FOREIGN PATENT DOCUMENTS

| EP | 0765061 A3 | 3/1997 |
|---|---|---|

* cited by examiner

| STEP | Sequence | Direction | Pass scramble seed: | Scramble both the message and the passed key with: | Un-scramble with: | Receive scramble key: |
|---|---|---|---|---|---|---|
| 400 | Server learns the MAC ID of client modem | | | | | |
| 410 | Send by server | downstream | nothing | Seeds based on MAC ID of client modem | | |
| 414 | Receive by client | | | | seeds based on own MAC ID | client receives no key |
| 420 | Send by client | upstream | upstream CRC code | Seeds based on MAC ID of client modem | | |
| 424 | Receive by server | | | | with seeds based on client modem MAC ID (the MAC ID of the client is known since by implication in a polling based system). | upstream CRC code |
| 430 | Send by server | downstream | random number | First by MAC ID based seed then with Seed based on the upstream CRC code | | |
| 434 | Receive by client | | | | First by seed based on the last upstream CRC code then by seed based on MAC ID | random number |
| 440 | Send by client | upstream | new upstream CRC code | First by seed based on the random number then by seed based on last upstream CRC code | | |
| 444 | Receive by server | | | | first by seed based on the last upstream CRC code then by seed based on the random number | new upstream CRC code |
| 450 | Send by server | downstream | new random number | first by seed based on the last random number then by seed based on the new CRC code | | |
| 454 | Receive by client | | | | first by seed based on the last upstream CRC code then by seed based on the last random number | new random number |
| 460 | Repeat steps 440 through 454 until new power up or lack of response causes restart with MAC ID | | | | | |

Fig. 4

DATA SCRAMBLING SYSTEM FOR A SHARED TRANSMISSION MEDIA

CROSS-REFERENCE TO RELATED APPLICATIONS

This application claims priority to a provisional application filed Nov. 8, 2000 and U.S. Ser. No. 60/246,684. This application also claims priority to another application assigned to common assignee coaXmedia, Inc and its priority document. The title of the claimed application is Architecture and Method for Automated Distributed Gain Control for Internet Communications for MDUs and Hotels (application Ser. No. 09/818,378 based on Provisional Application No. 60/193,855). The '855 application has the filing date of Mar. 30, 2000.

A related application by common assignee coaXmedia, Inc. is U.S. Ser. No. 09/908,754 for Priority Packet Transmission System For Telephony, Latency Sensitive Data, Best Efforts Data and Video Streams in a Shared Transmission Media Such as Passive Coax Distribution based on a provisional application filed Jul. 21, 2000 and having Ser. No. 60/219,886.

The present application represents an improvement over the previously filed applications so to the extent that there is a conflict between the text or figures in the priority applications and the text or figures of this disclosure, the contents of this disclosure would, of course, prevail.

For the convenience of the reader, various acronyms and other terms used in the field of this invention are defined at the end of the specification in a glossary. Other terms used by the applicant to define the operation of the inventive system are defined throughout the specification. For the convenience of the reader, applicant has added a number of topic headings to make the internal organization of this specification apparent and to facilitate location of certain discussions. These topic headings are merely convenient aids and not limitations on the text found within that particular topic.

In order to promote clarity in the description, common terminology for components is used. The use of a specific term for a component suitable for carrying out some purpose within the disclosed invention should be construed as including all technical equivalents which operate to achieve the same purpose, whether or not the internal operation of the named component and the alternative component use the same principles. The use of such specificity to provide clarity should not be misconstrued as limiting the scope of the disclosure to the named component unless the limitation is made explicit in the description or the claims that follow.

BACKGROUND

Technical Field

The present invention adds to the field of data communications. More particularly the invention is one of the ongoing improvements in the area of data communications addressing the use of tree and branch coax distribution systems for upstream and downstream data communication between a hub-server and a set of two or more client modems. Preferably, the client modems are adapted to allow a plug and play connection or other easy connection between a laptop and the tree and branch network. The tree and branch network is preferably connected to the Internet. Thus, the present invention can be used in a hotel or Multiple Dwelling Units (MDU's) or analogous buildings to allow plug and play access to the Internet over existing coax television networks.

The '378 application describes a system that allows the connection of devices such as personal computers to special modems that connect to a legacy tree and branch coax network in a hotel, Multiple Dwelling Units (MDUs), or analogous building. The system described used one frequency range bandwidth in two ranges outside of the range used for cable TV. Thus, the system would have one frequency range for a downstream channel and one frequency range for an upstream channel. As this is a tree and branch network, all communications heading downstream must identify which modem device (or devices) are being addressed since all modem devices will receive the communication. Conversely, the communication from the many individual modem devices to the upstream end of the network must be controlled so that only one modem device is sending an upstream communication at any one time in order to avoid bus contention. The method of control used in the referenced applications is based on polling and response model.

The situation addressed by both the '378 application and the current invention is shown generally in FIG. 1. FIG. 1 can be subdivided into four clusters of components. The first cluster is Cable-TV Headend equipment 10. The second cluster is the Hybrid Fiber-coax (HFC) Distribution Network 20. The third cluster is the premises coax distribution equipment 30 which could exist in either an MDU or an analogous situation such as a hotel. The final cluster is the cluster of equipment in the user's room 40. Clusters 30 and 40 contain elements of the present invention. In keeping with industry conventions, the Cable-TV headend and the Internet are the upstream end of FIG. 1 for cable TV and IP data respectively. The television set or computer in the user's room are the downstream points. Upstream data transmissions travel upstream towards the upstream end. Downstream transmissions travel downstream towards the downstream end. Thus, a component on a data path receives a downstream data transmission from its upstream end and an upstream data transmission from its downstream end.

The contents of Cable-TV Headend equipment 10 is described in the referenced '378 application and does not need to be repeated here. In general, a cable TV signal is provided to the HFC distribution network 20. Digital communication signals from Internet 15 travel through Cable-TV Headend equipment 10 to the HFC Distribution Network 20. The description of selected elements of the Cable-TV Headend is to provide context for the present invention and does not constitute a limitation or required elements for the present invention.

In cluster 30, the incoming signal from the HFC Distribution Network 20 is carried on cable 31 to joiner device 32. The joiner device 32 is connected to the input of TV Channel Amplifier 33. The Output of TV Channel Amplifier 33 is passed to a second joiner device 34 and then to set of one or more joiner devices forming the tree and branch distribution network 50 terminating at a series of TV coax Receptacles (not shown). The technology for tree and branch networks suitable to distribute Cable TV signals is well known to those of skill in the art. Thus, in order to avoid unnecessary clutter, the tree and branch network 50 is shown with just a few joiner devices and connecting cables rather than the full set of components for a tree and branch network.

Joiner devices 32 and 34 form a bypass around the TV Channel Amp 33. This bypass loop has a cable modem 35 at the upstream end and data hub 36 ("hub") (also called the "server") at the downstream end of the bypass loop. As described in the '378 application referenced above, the server 36 is comprised of a number of components shown here as RF modem 37, protocol converter 38, and NIC unit 39. The operation of these components was described in the '378 application and does not need to be repeated here. A coax tree and branch network 50 connects the head end 42 of the tree and branch network to a set of splitter devices.

A partial set of splitter devices is shown in FIG. 1 as splitters 52, 54, and 56. Thus, the signal at head end 42 is present at the input to client modem devices 60, 62, 64, 66, 68, and 70. Output jacks on the client modem devices allow for connection of televisions (71, 75, 80, 84, 86, and 90), devices such as personal computers (72, 81, 87, and 92), and telephones (74, 77, 78, 82, 85, and 88). Note that two telephones 77 and 78 are connected to modem device 64. Each of the two telephones is connected to its own telephone port. As the cable TV signal does not need to be processed within the modem devices, this signal can be taken from an external diplexer positioned upstream of the modem device rather than as shown from an output on the modem device. Note elements 94 and 96 will be discussed below.

The '378 application includes an RF coax transmission system in which all information flowing downstream (from 42 to the client modem devices 60, 62, 64, 66, 68, and 70) is formatted according to DVB/MPEG-2 structure to facilitate multimedia applications.

In order to assist in illustrating the concepts of the present invention, the preferred formats for use in the downstream and upstream transmissions in a particular coaXmedia system are illustrated in FIG. 2. The specifics of the data structure included for an example and do not represent mandatory aspects of the present invention.

The downstream transmission frame 100 is a 204-byte MPEG/DVB frame. The downstream transmission frame 100 is comprised of: a SYNC byte 104 (of value 47 hex for frame or packet start identification and B8 hex, i.e. inverted 47 hex for multi-frame identification); followed by two bytes used by MPEG2 for packet identification 108 ("PID"); followed by an additional byte reserved for packet type identification 112.a payload of 184 bytes; and a FEC field 120 of 16 bytes. The FEC field 120 is followed by a SYNC byte 104 from the next frame.

Any downstream data (whether IP, voice, video, etc.) is placed in one or more data sub-packets 130. One or more data sub-packets are carried in the MPEG frame payload 116. The specific organization of the data-sub packets is not important to this invention but the data sub-packets are generally comprised of a sub-packet header 134 and a sub-packet payload 136. The sub-packet header contains the address of the target and several control fields. The address used for the target could be the MAC address of the client modem, a sub-portion of the MAC address, a nickname for a client modem, a broadcast group address, or other form of address so that the client modem can recognize which sub-packets are addressed to that client modem. The sub-packet payload contains a CRC value 140 appended at the end of the data 138 within the sub-packet payload 136.

The upstream data frame 150 is comprised of: an 8-byte preamble 152; a SYNC byte 154; and a data packet 160. The specifics of the data packet are not important but can be usefully divided into a data packet header 166 and a data packet payload 168. The data packet payload 168 is of variable length and contains a CRC value 170.

The upstream data header 166 contains control fields to communicate the length of the variable payload and to identify the type of transmission. The particular system used by coaXmedia uses a polling scheme to grant time slots for the client modems (60, 62, 64, 66, 68, and 70) to use the upstream channel for communication to the server 36. Thus, in this system there is no need to identify the source of the upstream communication with a source address. In other systems such as those using contention detection and correction to provide shared use of the upstream channel, the upstream data header 166 would be likely to include a source address.

Data flow downstream and upstream is concurrent, as both use unique frequencies to transmit their data. For example, the downstream communications from server to client modem may be at a first frequency channel with the upstream data traveling on a second frequency channel. Thus, client modems listening to the first channel and speaking on the second channel cannot decode messages sent by other client modems as the client modem is not equipped to decode messages on the second channel.

Although the client modems intended for use in this system, are not capable of listening to the upstream channel and are designed to listen only to downstream messages addressed to that particular client modem, consumers prefer additional levels of security to protect data communications. This added protection would make the communications more secure despite actions by an unauthorized party to modify a client modem to listen to downstream traffic not addressed to that client modem or use unauthorized equipment that would attempt to eavesdrop on both upstream or downstream traffic. In order to illustrate the problem, FIG. 1 includes unauthorized device 94 connected to the tree and branch network 50 between splitter 54 and authorized client modem 70.

The actual location of the connection is not important to the present invention. The concern is that any connection to the tree and branch network would have access to all downstream communication to all connected computers (72, 81, 87, and 92). Fortunately, the operation of a tree and branch network works against the eavesdropping on the entire range of upstream communications. Even if unauthorized device 94 attempted to listen to upstream communications from client modems to the server 36 on the upstream channel, this would be difficult as the standard technology for tree and branch networks will attenuate upstream signals on parallel branches. The degree of attenuation grows with the number of splitter devices that must be traversed between the transmitting client modem and the unauthorized device 94. Thus, while unauthorized device 94 might receive a strong signal on the upstream channel from communications originating at client modem 70, communications on the upstream channel from client modem 66 would be attenuated. Communications on the upstream channel from client modem 64 would be further attenuated as that client modem is separated by two splitter devices (52 and 54) from unauthorized device 94.

The '378 application recognized that users would prefer a system with additional security. The '378 application addressed this desire by suggesting that different client modems use different randomization sequences for DVB spectral shaping. This variation between the randomization sequences used by various client modems would add to the complexity faces by anyone attempting to intercept communications. The '378 application contained teachings that the sequence start points for each client modem and for each direction could be varied. The communication of the information to initiate the DVB spectral shaping could be sent under a secure communication, such as an encrypted session with a public key/private key or other means known to those of skill in the art.

Implementation of the method suggested in the '378 application would preclude the use of some mass produced DVB randomization devices that do not allow the individualization of the DVB sequence or sequence start point. The establishment of a secure connection using conventional techniques such as public key/private key encryptions would require that the client modem have additional capabilities to support these brief encrypted sessions. The encrypted sessions to pass the information needed to individualize the DVB randomization would impose a delay on the process to add a client modem into the network. Finally, the '378 does not pass either a new sequence start point or new modification to randomization sequence once the client modem has been added to the network. Thus, for a particular client modem, the DVB randomization process continues along a set sequence after receiving the initial randomization sequence and/or sequence start point.

An objective of the present invention is to provide for added security for transporting upstream and downstream data between the client and the server.

Another objective of the present invention is to greatly increase the difficulty in obtaining access to downstream data by making it necessary for eavesdroppers to access information on the upstream channel in order to eavesdrop on the downstream channel.

Yet another objective of the present invention is to increase the difficulty in obtaining access to downstream data without requiring significant additions to the hardware required at the client modem.

BRIEF SUMMARY OF DISCLOSURE

The present invention is directed to various methods of providing additional security to communications over a shared transmission media. More specifically, the present invention provides a method to use scrambling seeds that are based on keys that are preferably passed in scrambled communications. A preferred embodiment of the present invention provides a method of sharing one new key with each upstream transmission from a client modem and one new key with each downstream transmission to that client modem to provide two scrambling seeds based on the keys for each transmission between the client modem and the server.

The present application teaches a method of initializing the process to pass the keys under an individualized but static seed and a modification to address the need to send multicast messages under an individualized but static regime.

These methods and the alternative embodiments provide a needed solution to the desire to enhance the security of communications over a shared medium.

These and other advantages of the present invention are apparent from the drawings and the detailed description that follows.

BRIEF DESCRIPTION OF THE DRAWINGS

FIG. 4 is a table showing a sequence of events in the one preferred embodiment of the present invention using two levels of scrambling.

DETAILED DESCRIPTION OF THE DISCLOSED EMBODIMENT

Figure 1:
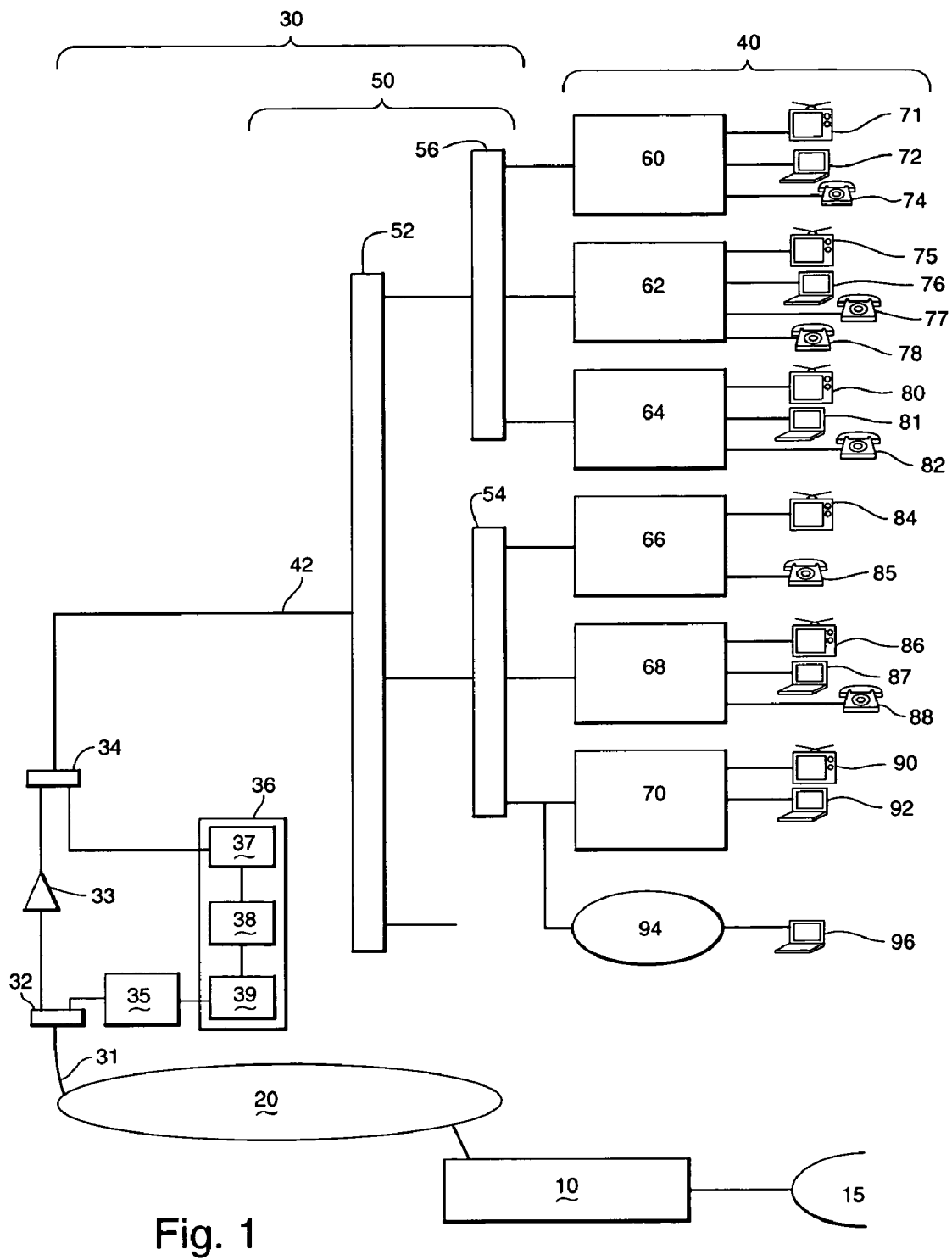
FIG. 1 shows network topology for a system that can use the present invention including a tree and branch network connected to a series of client modem devices, where the client modem devices are connected to combinations of televisions, devices such as personal computers, and telephones.
Figure 2:
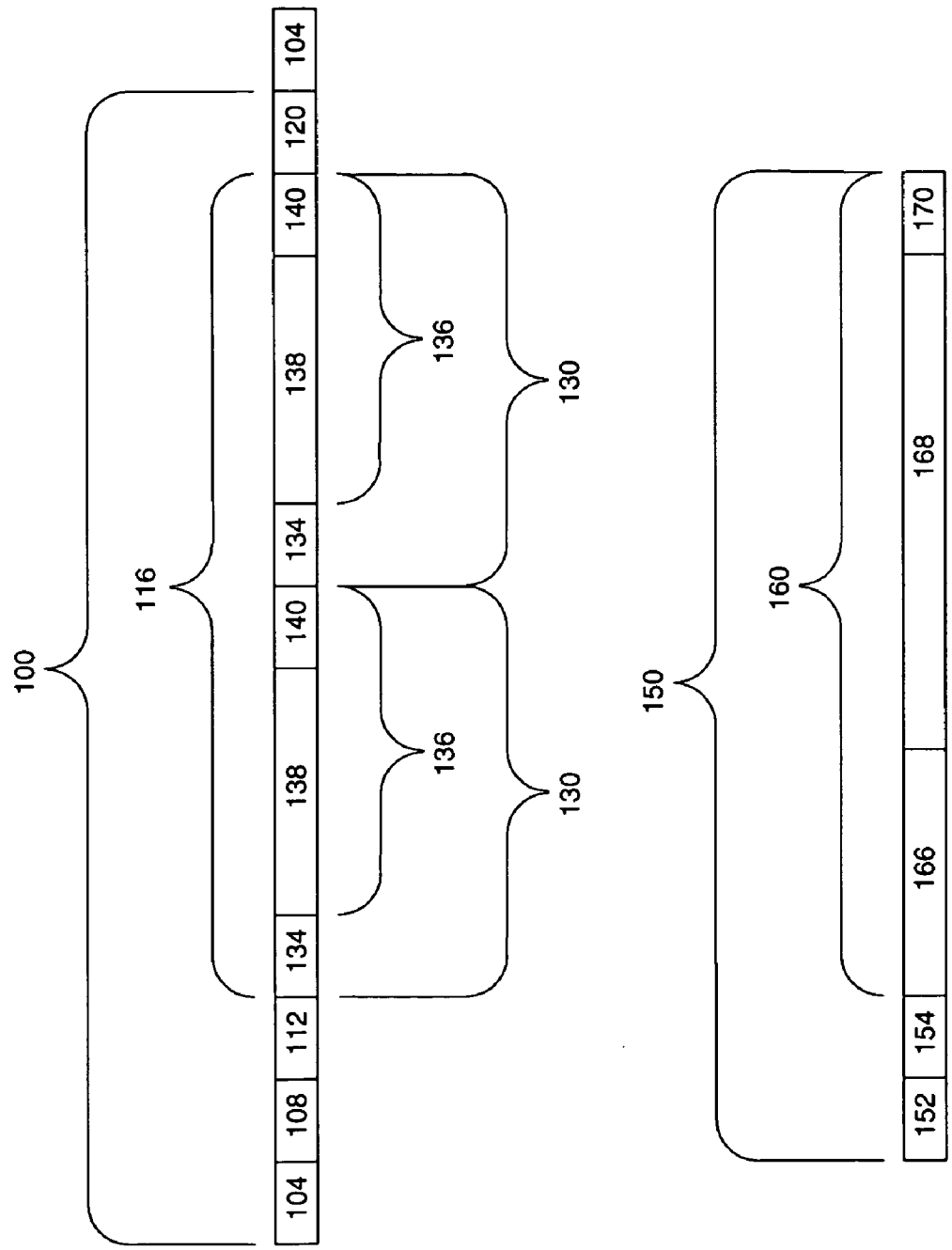
FIG. 2 shows downstream and upstream transmission formats used in this disclosure to illustrate certain embodiments of the present invention.

Before the addition of the present invention, standard operation for a network such as that shown in FIG. 1 would be for the server 36 to send downstream data that had undergone randomization for spectral shaping (DVB compliant) to the client modem (60, 62, 64, 66, 68, or 70). DVB randomization is sometimes called DVB scrambling. Unlike the alternative method of DVB randomization suggested in the referenced '378 application, traditional DVB randomization is not scrambling in the sense that it is intended to increase security. Traditional DVB randomization is done through a standard process in order to improve the transmission of data to make it easier to receive the transmitted information without transmission errors. Thus, if the unauthorized device 94 chooses to capture downstream transmissions for a communication session with device 72 addressed to client modem 60 these communications can be read by device 96 after the unauthorized device 94 passes the data communications them through the standard DVB sequence to reverse the DVB randomization for spectral shaping. (Note—a current MPEG/DVB protocol excludes the FEC field from DVB randomization.) To avoid confusion in the specification and the claims that follow, all references to scrambling shall refer to scrambling for the purpose of adding security rather than to DVB randomization.

The traditional DVB randomization process is part of the transmission process and is described in this specification as part of the context for this invention. The present invention does not require DVB randomization. As noted below, the present invention can be combined with the alternative method of DVB randomization suggested in the '378 application to provide additional layers of security.

To add additional protection to prevent an unauthorized device from obtaining unscrambled communications, the improved method calls for both upstream and downstream data to be scrambled twice for security. Note, while the preferred embodiment adds two levels of scrambling/un-scrambling for selected portions of the communication, the disclosure shows a method for adding just one additional level of scrambling/un-scrambling. One of skill in the art would be able to make minor modifications to the disclosed invention to add more than two levels of additional scrambling/un-scrambling operations.

As described above, a sub-packet 130 sent downstream is composed of the data sub-packet header 134 and an optional sub-packet payload 136 comprising the sub-packet data 138 and the sub-packet CRC field 140. The downstream coaX-media header is comprised of the target device address and several control fields.

The purpose of the scrambling is to protect the sub-packet data 138. Thus, these bits receive the scrambling for security purposes. In order to further complicate efforts to eavesdrop on downstream communications, the CRC field 140 also receives the scrambling. In a highly preferred embodiment of the present invention, some control fields of the sub-packet header also receive the scrambling.

Likewise, the upstream message would be sent with the data packet payload 168 scrambled. In a highly preferred embodiment, some or all of the data packet header 166 would also be scrambled. Scrambling some or all of the header would add an additional obstacle to those attempting to decipher the transmission since the length of the variable length payload would be scrambled. In one commercial embodiment of the coaXmedia system, the upstream transmission has padding to achieve a minimum transmission length. Thus, the lack of a non-scrambled length indicator would make it difficult to discern the end of data and the start of padding.

A Pseudo Random Binary Sequence ("PRBS") generator is used to scramble the data at the transmitter and to unscramble the data at the receiver. One suitable generator is a linear feedback shift register known to those of skill in the art. The PRBS generator starts with a seed value and then performs a series of manipulations on individual bits or sets of bits in the seed value. This process will then provide a repeatable sequence of pseudo random numbers. A well-designed linear feedback shift register will have a sequence of numbers that equals the 2 to N power where N is the size of the shift register. One typical use of a feedback shift register to scramble bits is to provide the feedback shift register with a seed value and then have the feedback shift register perform its manipulation of the register contents to move to the next number in the sequence. A particular bit from the feedback shift register is used in an exclusive OR operation with the first bit to be scrambled. The output of the exclusive OR becomes the replacement for the bit to be scrambled. Thus, depending on the value of the shift register bit, the scrambled output is either equal to the value in the unscrambled bit or it is inverted. The feedback shift register performs its manipulations of the register contents and then performs an exclusive OR operation on the next bit to be scrambled. At the receiving end, the process can be repeated. If a corresponding feedback shift register and identical seed is used, the scrambled message undergoes the same pattern of inversions and no inversions on the individual bits so that the received message after unscrambling is the same as the sent message before it was scrambled.

Figure 3:
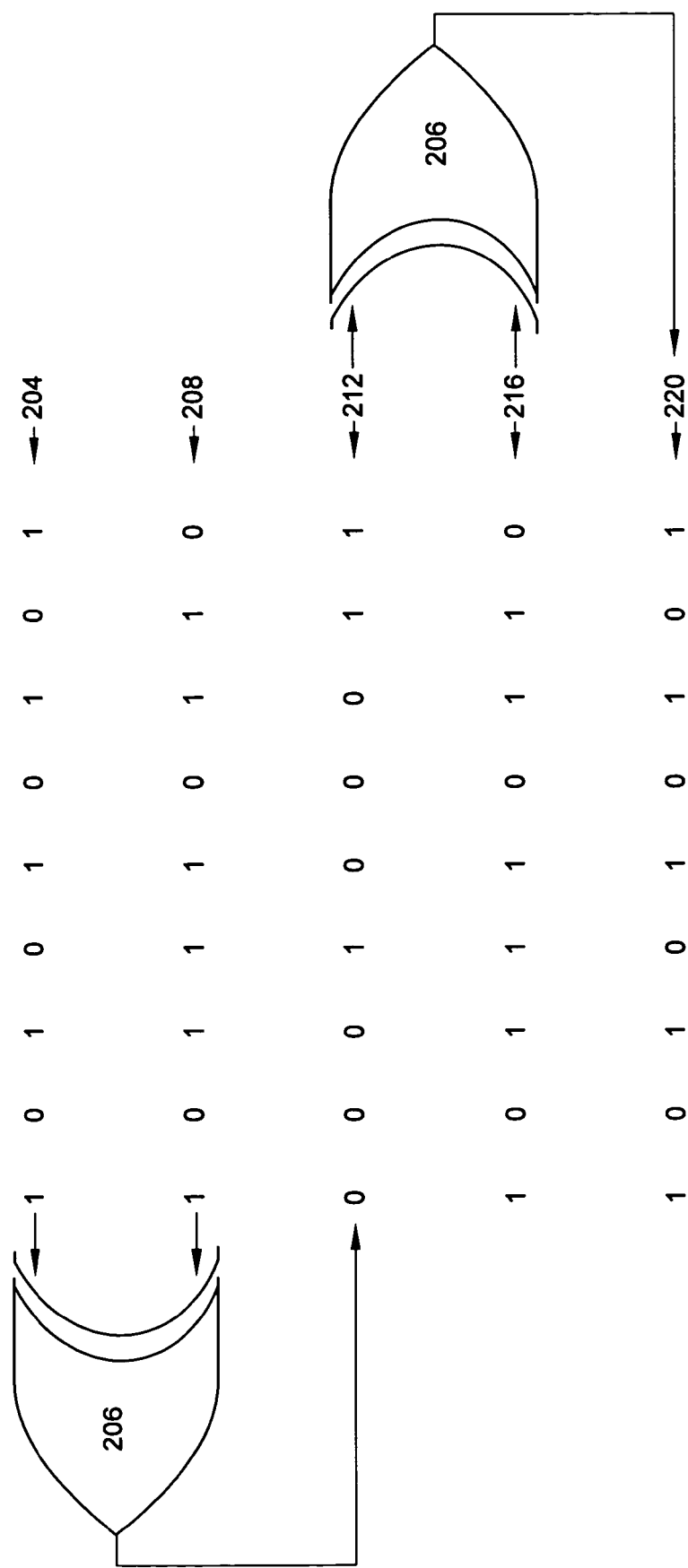
FIG. 3 is a conceptual drawing showing the process of scrambling and unscrambling a portion of a binary message.

Thus, as shown in FIG. 3, a portion of non-scrambled message 204 undergoes a bit by bit exclusive OR operation 206 with a sequence of bits 208 generated by the feedback shift register. The resulting sequence of scrambled bits is sent as part of scrambled message 212. At the receiving end, a feedback shift register performing the same internal manipulation for the same number of iterations after receiving the same seed as used at the transmit end will generate a sequence of bits 216 at the receive end. Repetition of the bit by bit exclusive OR operation 206 with the received scrambled message yields a received unscrambled message 220 that matches the non-scrambled send message 204.

One of the problems overcome by the present invention is the need to synchronize both ends of the link (client modem and server) with a scrambling seed (initial contents) that can be used in the PRBS generator without allowing other client modems or an unauthorized device 94 to have easy access to the seed. Often the actual seed is not passed but a key that is used to generate the seed. Thus, in the specification and the claims that follow a seed is the actual value fed to the scrambling device and the seed is a function of a key (including the trivial case where the seed equals the key). The key must remain confidential to protect the scrambled data and yet must be passed between the client modem and the server so that each will be able to un-scramble the incoming scrambled communications.

A solution to synchronizing both ends is to allow each client modem the ability to pick its own key and pass the key to the server in the upstream channel. The upstream channel (client modem to server) is in a different frequency band than the downstream channel and is not receivable by any other client modems. Therefore, this precludes one client modem from listening in on another client modem's upstream message and key by the fact that it is incapable of receiving any upstream RF channel. As mentioned above, the use of the upstream channel adds technical difficulty to any attempt to eavesdrop on downstream data transmissions, even if there is unauthorized listening on the upstream channel. These problems include the attenuation that would be present in attempts to listen to remote branches and the need to decipher upstream transmission in order to eavesdrop on downstream transmissions.

Figure 5:
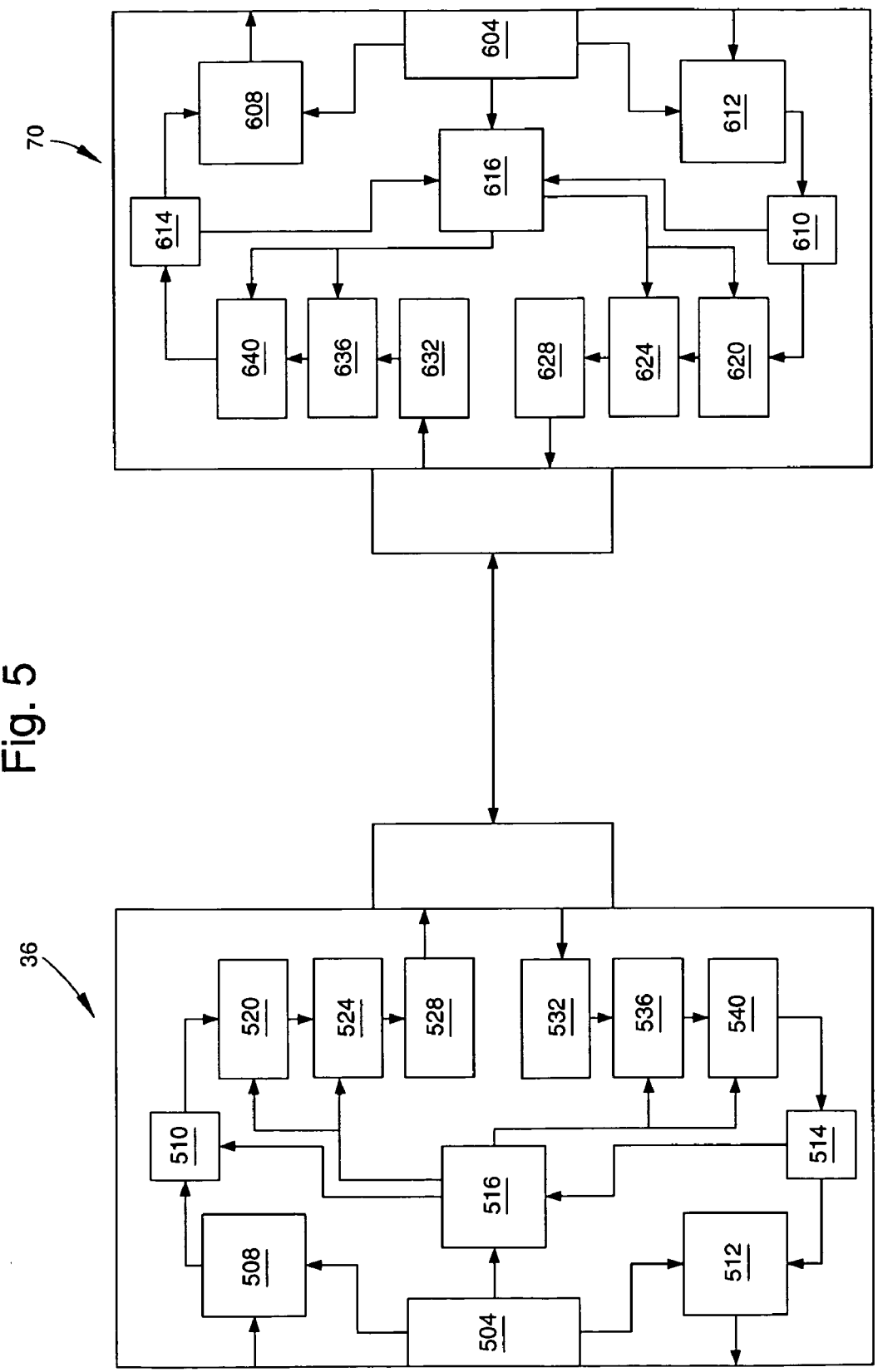
FIG. 5 is a conceptual drawing showing various logical components involved in the sequence of events set forth in FIG. 4.

The sequence of events for the preferred embodiment is as set forth below. FIG. 4 provides a summary of the sequence steps. FIG. 5 illustrates the relationship between logical components in the system to perform the various steps. The actual physical layout may differ from FIG. 5 as one or more logical functions may be performed by one physical device. In order to reduce the length of the names of various components, US will represent Upstream and DS will replace Downstream. FIG. 5 does not include other functions performed at the server 36 or at the client modem that are not relevant to the discussion of the present invention.

At power-up, a predetermined default seed word will be used for both the upstream and downstream scrambler. In the preferred embodiment, the seed will be based on the MAC ID for each client modem, although other values could be used to generate the seeds if the values were made known to both the client modem and the server. While the entire MAC ID could be used within the spirit of the present invention, it is likely that a shorter seed based on the MAC ID will be used. Since the seeds will be based on the MAC ID, this will mean each client will have a unique scrambling sequence at power-up. The MAC ID for an individual client modem can be made known to the server by keying the MAC ID with a keyboard connected to the server when the client modem is added as an authorized device. An inventive way of discerning the MAC ID of a newly discovered client modem is described in a co-pending application with U.S. Ser. No. 60/309,809 for a Method for Efficiently Detecting and Polling Downstream Modems in a Shared Transmission Media Such as Passive Coax Distribution on a Tree and Branch Network.

In STEP 410, a frame containing one or more sub-packets destined for delivery to one or more client modem arrives in DS Data Buffer 508. The sub-packets receive CRC values 140 calculated at CRC Calculator 510 based on a portion of the sub-packet. CRC values are one of the well-known methods of providing a transmission check word. Transmission check words are used to detect whether the transmission process altered the communication. Ideally, all altered communications are detected and discarded. By calculating a transmission check word and sending it with the transmission, the integrity of the transmission process can be checked by calculating the transmission check word on the relevant portion of the received communication and checking this value against the transmitted value of the transmission check word.

One known way of generating a CRC value is to treat the message as a long binary word, then divide the word by a set number and then transmit the remainder as the CRC value. Other methods of generating a CRC value may be used as long as the client modem and server both use the same algorithm to generate or check CRC values. As noted above, CRC values are sent as a means for detecting an error in the transmission process. A CRC calculation is performed on the received data and the data is discarded if the CRC value for the received data does not match the sent CRC value.

Continuing with STEP 410, after the server 36 has the MAC address of the target client modem (STEP 400), a seed can be sent from the key generator 516 to the DS Layer2 Scrambling block 520. The outgoing downstream message can be scrambled based on a seed fed to the feedback shift register where the seed is a known variation of the client modem MAC address. Thus, the message sent to the client modem will receive a first level of scrambling using a seed based on the MAC ID. As described above, the portion of the sub-packet that is scrambled can be the sub-packet payload 136 or the payload plus some of the control fields of the sub-packet header 134. Advantageously, one field in the sub-packet header 134 can be used to indicate that the message is using the MAC ID based seed as the scrambling seed. If this option is selected, then this portion of the sub-packet header 134 should not receive scrambling so that this field can be read before any attempt to unscramble the levels of scrambling. As an alternative to a non-scrambled field to note the use of the MAC ID based seed, the use of the MAC ID based seed could be the default seed to use to unscramble messages if the client modem does not have another seed value or if the last received seed value does not provide an unscrambled message that matches the transmitted CRC code.

In the preferred embodiment of the present invention, this process is repeated at DS Level1 Scrambling 524. Again, the seed is based on the MAC ID for the targeted client modem and this information is passed to block 524 from the Key Generator 516. In the preferred embodiment this second set of scrambling based on the MAC ID would not be the same as the first set of scrambling (else it would un-do the first set). The difference in scrambling could be achieved by using a different way to calculate the seed based on the target client modem MAC ID. Alternatively, the difference in scrambling could be achieved by having differences in the operation of the two feedback shift registers or having differences in both the feedback shift registers and the ways the seeds are calculated. Optionally, the system could operate initially with just one level of scrambling at either block 520 or block 524.

Conventional DVB randomization for spectral shaping is added by DS DVB Randomization block 528. The message is modulated and transmitted to the client modems on the downstream channel.

STEP 414, all the client modems receive the message and reverse the RF modulation. Next, each client modem removes the DVB randomization as represented by block 632. In the preferred embodiment, the client modem reads a field within the header of the sub-packet that indicates that the client modem must use its MAC ID as the basis for both of the seeds to unscramble the scrambled information. In the preferred embodiment, unscrambling is performed sequentially in DS Layer1 Scrambling block 636 and DS Layer2 Scrambling block 640. A CRC value is calculated at CRC Verify 614. If the CRC of the unscrambled sub-packet as calculated at block 614 in the client modem matches the passed CRC value from block 510 and the address in the sub-packet indicates that the target device is that particular client modem, then the message in the DS Data Buffer 608 is retained and used. If not, then the message is discarded. The client formulates its response (such as I have no data to send or the initiation of the process of transmitting data from the client modem). A response is created and placed in a frame that is placed in the US Data Buffer 612.

In STEP 420, a CRC value 170 is calculated at the CRC Calc block 610 and added to the upstream packet. The CRC value is passed to the Seed/Key Generator 616 for future use in STEPS 434 and 440. The client modem performs scrambling at first at US Layer2 Scrambling 620 and again at US Layer1 Scrambling 624 using a seed based on the MAC ID of the client modem. As discussed above, the two scrambling operations will use different ways to calculate the MAC ID based seeds, will manipulate the seeds differently in the feedback shift registers, or will do both.

In a one possible embodiment, a portion of the upstream data packet header 166 will receive the scrambling and a non-scrambled field will inform the server whether this upstream transmission is using the scrambling based on the MAC ID. However, the use of this field is not required in the preferred embodiment as the server interprets a response from the client modem as the next logical step in the initialization sequence and acts accordingly. In the preferred embodiment, only the server initiates a new attempt to connect with the client modem. Thus, it is only the client modem that must ascertain whether a communication is a continuation of a previous sequence of communications or a restart.

US DVB Randomization is added at block 632 and the frame is sent out with RF modulation on the upstream channel.

In STEP 424, the server receives the frame and demodulates it. The US DVB Randomization is removed at block 532. The US Layer1 Scrambling is removed at block 536 with a seed based on the MAC ID of the client modem.

A second round of unscrambling occurs at block 540. Again, a seed based on the MAC ID of the client modem is used. The sent CRC code 170 is checked against a CRC code calculated based on the received data packet in the CRC Verify block 514. If the CRC codes match, then the data packet is accepted and the CRC code is sent to the Key Generator 516 for subsequent use as a key for a seed value. If the CRC codes do not match then the received data packet is discarded.

In STEP 430, the process of sending downstream sub-packets is repeated. A random number generated by the Key Generator 516 is added to the data payload of the downstream data sub-packet at the CRC Calc block 510 before the CRC value 140 is again calculated in the CRC Calc block 510. An initial level of scrambling based on the MAC ID occurs at the DS Layer2 Scrambling block 520. DS Layer1 Scrambling is added at block 524 using a seed based on the most recent CRC code from the last upstream data packet received from the target client modem.

In STEP 434, the process of receiving downstream sub-packets is repeated in each client modem. After the DS DVB Randomization is removed at block 632, the DS Layer1 Scrambling is removed at block 636 using a seed based on the last CRC code for the last upstream transmission from that client modem. In the preferred embodiment, the client modem reads a non-scrambled field in the downstream data sub-packet indicating that the downstream sub-packet packet is scrambled with combination of a CRC code based seed and a MAC ID based seed. This field value tells the client modem that the last CRC code was received correctly by the server and that it should use the last upstream CRC code 170 as the key for the seed to scramble the next upstream message, which in turn passes a new CRC value.

The scrambling based on the MAC ID based seeds is removed in DS Layer2 Scrambling block 640. The unscrambled data sub-packet is used to generate another CRC value in the CRC Verify block 614. For all but one client modem this will not lead to an unscrambled data packet with a correct downstream CRC code 170 that matches the CRC code generated for the received data and a downstream address associated with that client modem. Thus, all but one client modem will discard the data sub-packet. The targeted client modem will correctly unscramble the data sub-packet and find that both the CRC code and the address are good. The CRC Verify block 614 will then pass the received random number to the Key Generator 616.

STEP 440 repeats the process of sending a data packet upstream. A new CRC code 170 is generated at the CRC Calc block 610 and placed in the upstream data packet 160. The upstream data packet is scrambled in US Layer2 Scrambling block 620 with a seed based on the random number key received in the last downstream transmission. The scrambled data packet is scrambled again at the US Layer1 Scrambling block 624 using a seed based on the CRC code from the previous upstream data packet. US DVB Randomization is added at block 628.

STEP 444 repeats the process of receiving an upstream transmission. After US DVB Randomization is removed in block 532, the US Layer1 Scrambling is removed in block 536 with the seed based on the CRC code of the previous upstream transmission from that particular client modem. After the US Layer1 Scrambling is removed, the US Layer2 scrambling is removed at block 540 with the seed based on the random number key passed with the last downstream transmission to that particular client modem.

As before, the sent CRC code 170 is checked against a CRC code calculated based on the received data packet in the CRC Verify block 514. If the CRC codes match, then the data packet is accepted and the CRC code is sent to the Key Generator 516 for subsequent use as a seed value. If the CRC codes do not match then the received data packet is discarded.

STEP 450 repeats the process of sending sub-packets downstream. A new random number is generated at the Seed/Key Generator 516 and passed to the CRC Calc block 510 to be inserted into the data portion of each downstream sub-packet before the CRC value 140 is calculated and added to the downstream sub-packets 130. The random number is stored in the Key Generator 516 for use in unscrambling the next upstream transmission from this particular client modem. DS Layer2 Scrambling occurs at block 520 using a seed based on the random number previously sent to the targeted client modem. DS Layer1 Scrambling occurs at block 524 using a seed based on the most recent CRC code from the last upstream transmission from the targeted client modem.

STEP 454 repeats the process of receiving a downstream transmission. The DS Layer1 Scrambling is removed correctly in block 640 for the targeted client modem through use of a seed based on the CRC code for the last upstream transmission from that client modem. The DS Layer2 Scrambling is removed correctly in block 636 through use of a seed based on the previously sent random number. The new random number sent by the server will be taken from a properly unscrambled message in the Calc Verify block 614 and stored in the Seed/Key Generator 616.

STEP 460, the process continues with US Layer1 Scrambling based on the most recent upstream CRC code from that particular modem and US Layer2 Scrambling based on the most recent random number sent by the server to that particular client modem. This process will continue until there is some interruption that causes the process to be restarted with the use of the MAC ID based seed.

As would be apparent to one of skill in the art, the server must maintain the relevant random numbers and CRC codes for each of the client modems. A variation of the preferred embodiment would be to have seeds based on manipulation of a sequence of keys. Thus, the key for the DS Layer1 Scrambling could be based on a number of the least significant bits of the sum of the last six stored CRC values for a particular client modem. Alternatively, a set of CRC values and random numbers could be accumulated for a particular client modem before switching from the MAC ID based seeds. This accumulation of values would allow the use of a lag between the transmission of a CRC value or a random number and its use. These concepts could be combined so that the seed is a function of the second and fourth most recent CRC code for a particular the key for the DS Layer1 Scrambling could use a CRC value from the second and fourth most recent communications from the client modem. The same sort of manipulations can be applied to the server created key values.

Restarting

Restarting would be necessary after the server 36 has received a seed from a client modem, if later the server sent the client modem a poll message or transmitted a packet and did not receive a reply from the client modem. In such a situation, the server will immediately return to using the power-up scrambling seeds, which in this case are based on the MAC ID. The downstream data sub-packet would have the relevant header field indicating that the MAC ID based seeds were used for that packet and this would tell the client modems to use the MAC ID based seeds. Thus, if the downstream message is contaminated and the client modem does not reply, the process will briefly return to using the MAC ID seeds to reinitiate the communications. Likewise, if the upstream message is contaminated, the server will briefly return to using the MAC ID seeds to reinitiate the communications.

Preventing a Seed Value of Zero

A preferred embodiment has an added nuance to prevent the scrambling from being initialized with an all zeros seed. (Some feedback shift registers do not effectively change an all zero seed.) One way of preventing an all zero seed is to make the actual scrambler seed at least one bit longer than the fed seed. The extra bit would always be set to one so that the seed used for scrambling is always initialized with a non-zero number. The use of feedback shift registers that alter an all zero seed or the use of seed and key generators that do not generate seeds of all zero are other ways of preventing problems from an all zero seed Alternative Embodiments As noted here and in various places in the text above, the novel method can be adapted in a wide variety of ways by those of skill in the art.

The preferred embodiment uses two levels of scrambling. One of skill in the art could use the steps set forth above to initiate one level of scrambling based on the upstream CRC code as set forth above and not add the second level of scrambling based on the server generated random number.

Alternatively, one of skill in the art could use the server generated random number as the next step after the scrambling using a MAC ID based seed and use this as the one level of scrambling.

One could substitute the use of the downstream CRC code for the server-generated random number in a scheme with two levels of scrambling. Thus, the downstream CRC code 170 would be passed to the Seed/Key Generator 516 instead of passing the random number from the Seed/Key Generator 516 to the CRC Calc block 510. This would have the advantage of saving bandwidth as the CRC code is already in the downstream data and no additional bits would need to convey the server-generated random number. The system could be adopted to use the downstream CRC code and a random number generated by the client modem. Likewise, one of skill in the art could choose to deploy the teachings of the present invention with a system that uses a random number generated by the client modem and a random number generated by the server. The downside of using random numbers is this adds to the overhead that must be passed with the data.

One could change the order in which the CRC based scrambling and the random number based scrambling was applied to individual messages. The order would not need to be symmetrical between the upstream and the downstream processes. Thus, the upstream messages could be scrambled first by the CRC based seed and then by the random number based seed with the downstream messages scrambled first by the random number based seed and then by the CRC based seed.

In summary, it should be pointed out that the dual set of seeds for each server to client link communication would be unique to each client (with the exception of multicast messages discussed below) and to each packet. Once the random number based scrambling is added to the upstream CRC code based scrambling, the scrambling pattern will be dynamically changing with every packet.

A variation of the disclosed invention is to use the disclosed method to improve the method for improved security disclosed in the referenced '378 application by passing keys to modify the sequence start point for the DVB randomization. This could be done in addition to or as an alternative to one of the scrambling stages. This would allow for an improvement over the method suggested in the '378 application in that it would afford dynamic variation of the sequence start point for the DVB randomization. Using the disclosed method to provide the DVB sequence start point alleviates the need to establish a secure communication session under traditional methods before passing the sequence start point for the DVB randomization. Alternatively (or additionally), the disclosed invention could be used to pass a static key or a set of dynamic keys to select a particular DVB randomization scheme out of several possible DVB randomization schemes.

While the preferred embodiment of the present invention does not combine the suggestion of the '378 to provide added security via a specially modified DVB randomization based on static inputs, the method of the '378 could operate as an added layer of security in a system using the double key double scrambling method set forth above.

Multicast Messages

Multicast messages are data packets sent downstream that are sent to a predetermined set of client modems. This could be all of the client modems or some set of one or more. Multicast messages may be used in a variety of applications such as conference calls where more than one telephone needs to receive the signal, broadcast of videos to multiple subscribers, multi-player gaming or other applications. Since the multicast message is usually sent to more than one client, none of the clients can send a response back to the server else the return messages would collide. The data sent downstream must still be scrambled but the seed word cannot be dynamically chosen by the upstream message since the client modems cannot respond to the multicast message.

Instead, the server will generate multicast one or more scrambling seeds for a given multicast group and send the seed or keys for the seeds to each multicast group member client modem via a special message that is inherently protected by the scrambling technique with two levels of scrambling. To make it more difficult to unscramble messages that do not have dynamic seeds, the system could be set to pass two seeds so that the multicast messages are protected by two levels of scrambling. Therefore, the transmissions to the multicast group will be protected by double scrambling but the dynamic and unique packet-to-packet scrambling will not occur.

A system using multicast messages would tend to not scramble the address portion of the downstream data sub-packet. The client modem needs to read the non-scrambled address in order to determine whether to use the regular keys for a message from the server to the client modem or use the special multicast keys for the specific multicast group to generate the seeds to un-scramble the scrambled portion of the communication.

Miscellaneous

Those skilled in the art will recognize that the methods and apparatus of the present invention has many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

GLOSSARY OF ABBREVIATIONS

| | |
|---|---|
| FEC | Forward Error Correction |
| IP | Internet Protocol |
| MPEG | Motion Picture Experts Group (Digital Video Standards) |
| DVB | Digital Video Broadcast |
| CRC | Cyclic Redundancy Check |
| PID | Packet Identifier |
| PRBS | Pseudo Random Binary Sequence |
| RF | Radio Frequency |
| US | Up Stream or United States |
| DS | Down Stream |

What is claimed is:

1. A method of maintaining additional security for communications between an upstream server and at least two downstream client modems on a shared communication media through use of a dynamic key generated by the particular client modems, the method comprising:

A. the server receiving a scrambled upstream communication from a first client modem, wherein the upstream communication is a packet;
B. the server unscrambling a scrambled packet containing a new key for the first client modem using a previous seed for the first client modem based on a previous key for the first client modem received in a previous upstream packet from the first client modem;
C. the server storing information sufficient to create a new seed for the first client modem based on the new key for the first client modem based on the unscrambled contents of the upstream packet;
D. the server scrambling at least a portion of the next downstream communication to a second client modem with scrambling based on a seed for the second client modem based on a key for the second client modem, where in the key for the second client modem is unrelated to the key for the first client modem, wherein the downstream communication is a subpacket;
E. the server scrambling at least a portion of the next downstream subpacket to the first client modem with scrambling based on the new seed for the first client modem based on the new key for the first client modem;
F. the first client modem receiving the next downstream subpacket scrambled for the first client modem;
G. the first client modem unscrambling the scrambled portion of the next downstream subpacket scrambled for the first client modem with the new seed for the first client modem based on the new key for the first client modem;
H. the first client modem creating a next upstream packet containing a next key for the first client modem;
I. the first client modem storing information sufficient to create a next seed for the first client modem based on the next key for the first client modem; and
J. the first client modem scrambling at least a portion of the next upstream packet using the new seed for the first client modem based on the previously communicated new key for the first client modem.

2. The method of claim 1 wherein the new seed for the first client modem equals the new key for the first client modem.

3. The method of claim 1 wherein the new key for the first client modem is a transmission check word used for the purpose of testing the accuracy of the upstream transmission, such that the new key for the first client modem is transmitted with the upstream packet without adding to the overhead.

4. The method of claim 1 wherein the new key for the first client modem is a random number generated by the first client modem and not a trasmission check word.

5. The method of claim 1 wherein the scrambled portion of the upstream packet includes a portion of the data packet header.

6. The method of claim 5 wherein the scrambled portion of the upstream packet includes a field conveying the length of a variable length data packet.

7. The method of claim 1 wherein first client modem unscrambles the scrambled portion of the next downstream subpacket to the first client modem with the new seed for the first client modem based on the new key for the first client modem only when a field in the next downstream communication lacks a signal to use a default seed based on a default key.

8. The method of claim 7 where the default key is based on the address of the first client modem.

9. The method of claim 7 wherein the previous key for the first client modem received in a previous upstream packet from the first client modem was sent with scrambling based on the default key.

10. The method of claim 1 further comprising the preliminary steps of exchanging upstream packets and downstream subpackets between the server and the first client modem, the preliminary communications scrambled with a default seed until the server has stored information sufficient to create an initial first client modem seed based on an initial first client modem key.

11. The method of claim 1 wherein a scrambled value is passed with one communication and the value is used to alter the DVB randomization of the next communication whereby the controlled variation in the DVB randomization provides a layer of security to protect the next communication from an eavesdropper as the eavesdropper would need the passed value in order to reverse the non-standard DVB randomization.

12. The method of claim 1 wherein:
the server sent a multicast address key and a multicast ad address in the next downstream subpacket to the first client modem;
the server sent the same multicast address key and the same multicast address in the next downstream subpacket to the second client modem;
and further comprising the step of:
the server creating a multicast subpacket addressed to a multicast group comprising the first client modem and the second client modem;
the server sending the multicast subpacket after scrambling a portion of the multicast communication with a seed based on the multicast address key.

13. The method of claim 1 wherein the server scrambles the next downstream subpacket to the first client modem with a seed based on both:
the new key for the first client modem, and
an earlier key for the first client modem received before the new key for the first client modem.

14. A method of maintaining additional security for communications between an upstream server and at least two downstream client modems on a shared communication media through use of a dynamic key generated by the server, the method comprising:
A. the server storing information sufficient to create a seed for the first client modem based on a key for the first client modem generated by the server, the key for the first client modem to be sent in a downstream communication to a first client modem, wherein the downstream communication is a subpacket;
B. a second client modem receiving a downstream subpacket from the server;
C. the second client modem unscrambling a scramble portion of the downstream subpacket containing a new key for the second client modem using a seed for the second client modem based on a key for the second client modem received in a previous downstream subpacket from the server;
D. the second client modem storing information sufficient to create a new seed for the second client modem based on the new key for the second client modem received in the unscrambled contents of the downstream subpacket;
E. the second client modem scrambling the next upstream packet to the server with scrambling based on the new seen for the second client modem based on the new key for the second client modem, wherein the upstream communication is a packet;

F. the server receiving the next upstream packet from the second client modem;

G. the server unscrambling the scrambled portion of the next upstream packet from the second client modem with the new seed for the second client modem based on the new key for the second client modem;

H. the server creating a next downstream subpacket containing a next key for the second client modem;

I. the server storing information sufficient to create a next seed for the second client modem based on the next key for the second client modem without impacting the previously stored information sufficient to create the seed for the first client modem based on the first client modem key; and J. the server scrambling at least a portion of the next downstream subpacket using the new seed for the second client modem based on the previously communicated new key for the second client modem.

15. A method of dynamic do double scrambling of communications sent to and from a particular client modem; the method comprising the steps of;

A. a server identifies the existence and the address of first client modem on a shared transmission media;

B. the server creates and transmits a downstream communication addressed to the first client modem with a portion of the downstream communication scrambled twice based on two default scrambling seeds, the downstream communication containing a control field indicating that the default seeds were used, wherein the downstream communication is a subpacket;

C. the first client modem receives the downstream subpacket and recognizes that the default seeds were used;

D. the first client modem unscrambles the downstream subpacket using the default seeds;

E. the first client modem creates and transmits an upstream communication, before transmission the upstream communication scrambled twice with the two default seeds, the scrambled portion of the upstream communication containing a key created by the first client modem, wherein the upstream communication is a packet;

F. the server receives the upstream packet and the server unscrambles the scrambled upstream packet using the default seeds and stores the key created by the first client modem;

G. the server creates and transmits a downstream subpacket addressed to the first client modem with the control field indicating that the communication is scrambled using one default scrambling seed and one seed based on the key created by the first client modem, a portion of the downstream subpacket scrambled once with one default seed and once with one seed based on the key created by the first client modem, the scrambled downstream subpacket including a key created by the server for communication with the first client modem;

H. the first client modem receives the downstream subpacket$_{13}$and reads the control field;

I. the first client modem unscrambles the downstream subpacket using the one default seed and one seed based on the last transmitted key created by the first client modem;

J. the first client modem stores the key created by the server for communication with the first client modem;

K. the first client modem creates and transmits an upstream packet, before transmission of the upstream packet including the new key created by the first client modem is scrambled twice using the one seed based on the last transmitted key created by the first client modem and one seed based on the last transmitted server created key for communication with the first client modem;

L. the server receives the upstream packet, and unscrambles the upstream packet using one seed based on the previously stored key created by the first client modem and one seed based on the last transmitted server created key for communications with the first client modem;

M. the server stores the last transmitted key created by the first client modem;

N. the server creates and transmits a downstream subpacket addressed to the first client modem with the control field indicating that the subpacket is scrambled using one seed based on the last transmitted key created by the first client modem and one seed based on the last transmitted server created key for communication with the first client modem; a portion of the downstream subpacket scrambled once with one seed based on the last transmitted key created by the first client modem and once with one seed based on the last transmitted server created key for communication with the first client, the scrambled portion of the downstream subpacket containing a new server created key for communication with the first client modem;

O. the first client modem receives the downstream subpacket and reads the control field;

P. the first client modem unscrambles the downstream subpacket using one seed based on the previously stored server created key for communication with the first client modem and one seed based on the last transmitted key created by the first client modem;

Q. the first client modem stores the last transmitted server created key for communication with the first client modem, REPEAT steps K through Q;

UNTIL detecting a break in the communications between the first client modem and the server;

THEN GOTO Step B.

16. The method of claim 15 wherein the key created by the first client modem is a transmission check word.

17. The method of claim 15 wherein at least one of the default seeds is used solely for communications with the first client modem.

18. The method of claim 15 wherein at least one of the default seeds is derived from an address of the first client modem.

* * * * *